United States Patent
Katsumata et al.

(10) Patent No.: US 7,728,536 B2
(45) Date of Patent: Jun. 1, 2010

(54) SERVOMOTOR CURRENT CONTROL METHOD AND SERVOMOTOR

(75) Inventors: Kazuhiro Katsumata, Gotemba (JP); Takamichi Ito, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 488 days.

(21) Appl. No.: 11/574,608

(22) PCT Filed: Aug. 18, 2005

(86) PCT No.: PCT/JP2005/015050

§ 371 (c)(1),
(2), (4) Date: Mar. 2, 2007

(87) PCT Pub. No.: WO2006/027941

PCT Pub. Date: Mar. 16, 2006

(65) Prior Publication Data

US 2008/0012521 A1    Jan. 17, 2008

(30) Foreign Application Priority Data

Sep. 3, 2004  (JP) ............................. 2004-256908

(51) Int. Cl.
 *H02P 21/00* (2006.01)
(52) U.S. Cl. ................................. 318/400.02; 318/432
(58) Field of Classification Search ......... 318/432–434, 318/609, 610, 632, 727, 800, 400.02
See application file for complete search history.

(56) References Cited

U.S. PATENT DOCUMENTS 6,427,104 B1 *  7/2002  Matsushita et al. ............ 701/41
6,906,442 B2 *  6/2005  Yamaguchi ............. 310/156.43
7,053,581 B2 *  5/2006  Chen et al. .................. 318/609

(Continued)

FOREIGN PATENT DOCUMENTS

JP  09-084400   3/1997

(Continued)

OTHER PUBLICATIONS

English Language Abstract of JP 09-084400 published Mar. 28, 1997.

(Continued)

*Primary Examiner*—Walter Benson
*Assistant Examiner*—Eduardo Colon-Santana
(74) *Attorney, Agent, or Firm*—DLA Piper LLP US

(57) ABSTRACT

Under a low load condition, a produced torque is small and a synthetic current command I* with respect to an armature of a servomotor is small so that a magnitude in a negative direction of a reactive current command Id* determined by Id*=−|I*|·sin θ is small. As a result, under the low load condition, the synthetic current flowing through the armature can be small, and generation of wasteful heat can be suppressed. Further, under a high load condition, because a q-axis current Iq that produces the torque is large, voltage saturation is liable to occur. However, at the same time, the overall current command I* is large under the high load condition, and Id* is large in the negative direction. Therefore, a large reactive current Id can be flowed in the negative direction, and voltage saturation under the high load condition can be effectively prevented.

9 Claims, 6 Drawing Sheets

U.S. PATENT DOCUMENTS

| | | | |
|---|---|---|---|
| 7,332,837 B2* | 2/2008 | Ward et al. | 310/54 |
| 7,489,099 B2* | 2/2009 | Fujiwara et al. | 318/609 |
| 2004/0119373 A1* | 6/2004 | Akatsu | 310/266 |
| 2005/0017588 A1* | 1/2005 | Yamaguchi | 310/156.45 |
| 2006/0049792 A1* | 3/2006 | Chen et al. | 318/716 |
| 2008/0067960 A1* | 3/2008 | Maeda et al. | 318/400.02 |
| 2009/0120714 A1* | 5/2009 | Hisanaga et al. | 180/446 |

FOREIGN PATENT DOCUMENTS

| | | |
|---|---|---|
| JP | 11-178399 | 7/1999 |
| JP | 2002-305899 | 10/2002 |
| JP | 2006-074933 | 3/2006 |
| JP | 2007-151294 | 6/2007 |

OTHER PUBLICATIONS

English Language Abstract of JP 11-178399 published Jul. 2, 1999.

English Language Abstract of JP 2002-305899 published Oct. 18, 2002.

English Language Abstract of JP 2007-151294 published Jun. 14, 2007.

English Language Abstract of JP 2006-074933 published Mar. 16, 2006.

English Machine Translation of JP 09-084400 published Mar. 28, 1997.

English Machine Translation of JP 11-178399 published Jul. 2, 1999.

English Machine Translation of JP 2002-305899 published Oct. 18, 2002.

English Machine Translation JP 2007-151294 published Jun. 14, 2007.

English Machine Translation of JP 2006-074933 published Mar. 16, 2006.

* cited by examiner

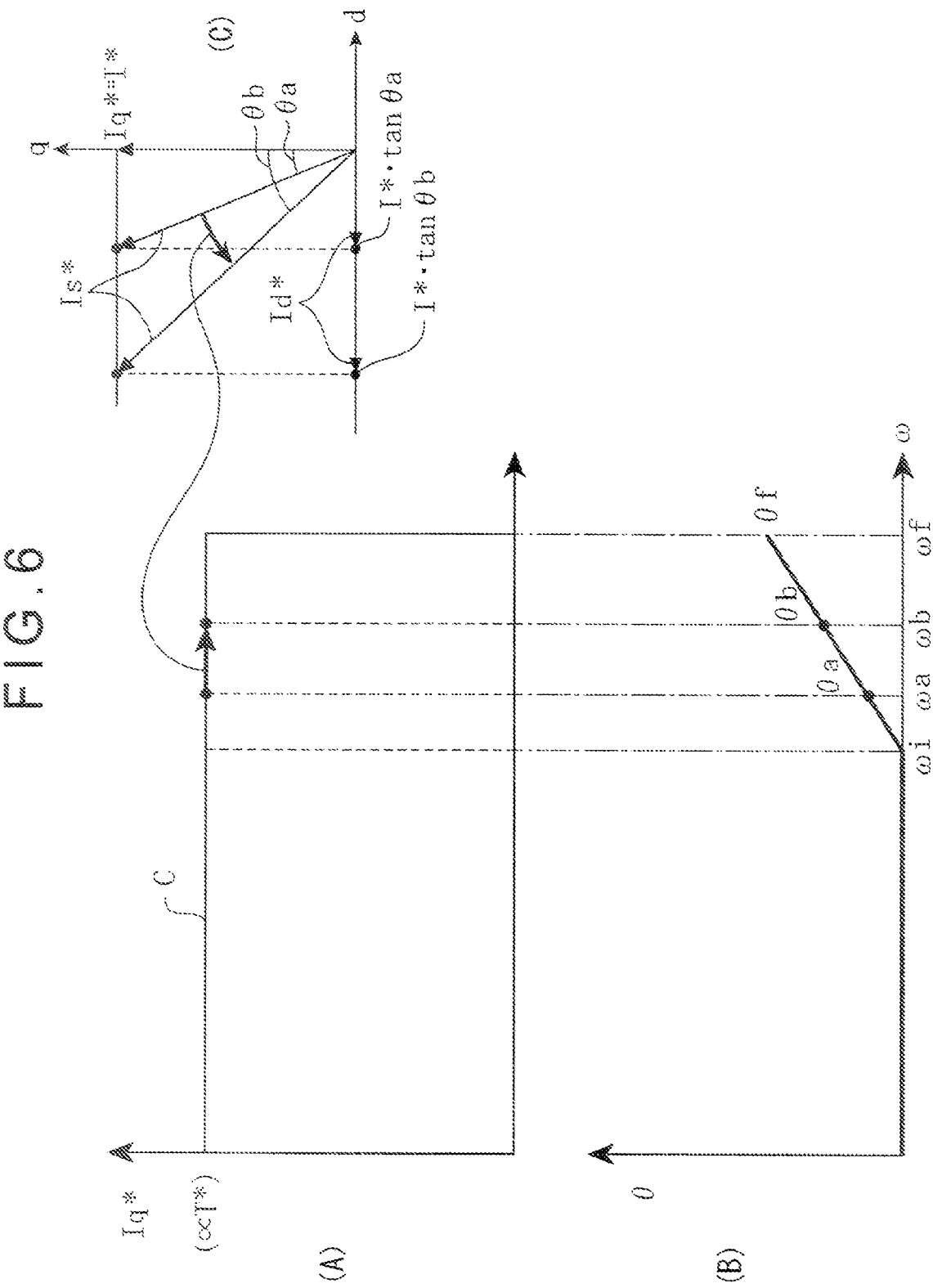

SERVOMOTOR CURRENT CONTROL METHOD AND SERVOMOTOR

TECHNICAL FIELD

The present invention relates to a servomotor current control method and to a servomotor. More specifically, the present invention relates to a current control method capable of preventing an occurrence of a voltage saturation in the servomotor by supplying a negative reactive current Id to a dq-converted armature, and also relates to a servomotor equipped with a structure for performing the above-mentioned current control method.

BACKGROUND ART

Conventionally, in order to prevent occurrences of voltage saturations in AC servomotors, the following measures have been taken. That is, a negative d-axis current Id is supplied to an armature to which a dq conversion has been performed, while a d-axis direction is defined as a direction of field flux (refer to, for example, Patent Document 1). In an AC servomotor, a q-axis current Iq corresponds to an active current which is supplied in order to generate rotation torque, whereas Id corresponds to a reactive current which does not contribute to the generation of the rotation torque. However, because the current Id is supplied, an influence caused by back electromotive force produced in an armature can be reduced, and thus, a larger active current Iq can be supplied. As a result, current and torque control operations can be carried out stably.

This fact is well represented in FIG. 2 and FIG. 9 of Patent Document 1. These drawings indicate that an armature voltage is divided into 2 orthogonal voltage components, namely, a d-axis voltage Vd and a q-axis voltage Vq. A total vector summation between Vd and Vq is equivalent to a synthetic voltage in the armature. A circle shown in the drawing represents a link voltage, and this link voltage defines an upper limit value of the armature voltage. As a consequence, a desirable armature voltage is generated in accordance with the indication of this drawing as long as a tip portion of an armature voltage vector is present within the link voltage circle. Conversely, if the tip portion of the armature voltage vector is derived outside the link voltage circle, then the desirable voltage is not produced, and the desirable q-axis current Iq for generating the toque cannot be supplied (namely, so-called voltage saturation).

Next, in the respective drawings, back electromotive force E corresponds to a vector of a +q-axis direction, and concretely speaking, is expressed by such an equation E=ω·Φ which is well known in a synchronous type AC servomotor. In this equation, ω shows a rotation angular velocity of the motor, and Φ indicates synthetic magnetic flux which is intersected with an armature winging. The following description is made under such an assumption that ω≧0 and Φ≧0 are established, unless a specific comment is made. As previously described, since the back electromotive force E is directly proportional to ω, this back electromotive force E becomes larger during high-speed rotation. In FIG. 9, when the back electromotive vector E is increased, a tip portion of this vector is approached to the circumference of the link voltage circle, so that a large current Iq cannot be supplied. This reason is because, if Iq is increased, then a drive voltage vector of a +q-axis direction (same direction as E) is prolonged, so that the tip portion of the armature voltage vector is derived from the link voltage circle, and therefore, a voltage saturation occurs. The drive voltage vector is expressed as R·Iq in this drawing.

However, in this case, as shown in FIG. 2, if a reactive current Id (≦0) is supplied, then the difficulty is solved. This reason is given as follows. That is, by supplying Id, such a canceling voltage vector−ω·L·|Id|(−q-axis direction) can be generated which is directed opposite to the back electromotive vector E. Since this canceling voltage vector of the −q-axis direction is added, even when the above-mentioned drive voltage vector R·Iq of the +q-axis direction is prolonged, a tip portion of an armature voltage vector functioning as a summation of those vectors can be held within the link voltage circle. As a consequence, in accordance with this method, the large current Iq can be continuously supplied even during the high-speed rotation, and thus, large torque (∝Iq) can be stably generated.

[Patent Document 1] JP-A-9-84400 (pages 2 to 4, FIGS. 2 and 9)

DISCLOSURE OF THE INVENTION

Problems to be Solved by the Invention

On the other hand, in Patent Document 1, while considering such a fact that the back electromotive force E is directly proportional to the rotation angular speed ω of the motor, the reactive current Id is defined as a one variable function only of ω, and then, the larger ω becomes, the larger the reactive current Id is supplied in the negative direction in order to avoid the generation of the voltage saturation. In Patent Document 1, when ω is determined, Id is exclusively determined. As a result, the value of the reactive current Id does not depend upon the magnitude of the torque generated in the motor.

As a consequence, if the motor is rotated in a high speed (107; large), then the large reactive current Id is continuously supplied in the negative direction. On the other hand, even during the high-speed rotation operation, when a load given to the motor is low, generated torque may be reduced, so that the active current Iq (∝ generated torque) can be reduced. Accordingly, in FIG. 9 of Patent Document 1, because the drive voltage vector R·Iq can be made short, even if the back electromotive force E=ω·Φ is large, or even if the canceling voltage vector −ω·L·|Id| based on the reactive current Id is small, the armature voltage vector functioning as a synthesized vector of those vectors may be held within the link voltage circle. As a consequence, there is no need to supply the large reactive current Id in the negative direction at this time.

However, in Patent Document 1, even in such a case, the large reactive current Id is continuously supplied in the negative direction. When such a waste current is still supplied, extra heat may be continuously generated which need not be originally generated. As a result, the following various problems may occur. That is, an additional compensating measure is required in view of maintenance management aspects of the motor, and the energy efficiency of the motor is deteriorated.

The present invention has been made to solve the above-mentioned problems, and therefore, has an object to provide a current control method capable of suppressing a generation of extra heat and capable of effectively preventing an occurrence of a voltage saturation by controlling a value of a reactive current Id in response to torque generated in a motor, and is to provide a servomotor equipped with a structure for extracting the above-mentioned current control method.

Means for Solving the Problems

According to the present invention, there is provided a current control method for a servomotor, the servomotor including: an armature having armature windings of multiple phases; and a field, the servomotor having such a structure that: armature currents are supplied to the armature windings having the respective multiple phases to generate armature magnetic flux; and the armature and the field are relatively rotated with each other based on an interaction between the armature magnetic flux and field flux produced by the field to generate rotation force, the current control method including: supplying a negative d-axis current Id to the armature to which a dq conversion has been performed while a d-axis direction is a direction of the field flux to prevent an occurrence of a voltage saturation in the servomotor, in which under a condition that a relative rotational speed of the armature and the field is constant, the d-axis current Id is increased in a negative direction in response to a magnitude |Iq| of the q-axis current.

As previously described, the torque T generated in the servomotor is directly proportional to the q-axis current Iq. More specifically, the torque T is expressed by $T \propto \Phi \cdot Iq$. In this equation, $\Phi$ is identical to the above-mentioned synthetic magnetic flux which is intersected with the armature winding.

A direct proportional relationship of $T \propto Iq$ indicates that, if the torque T having a large absolute value is generated, a current Iq having a large absolute value must be supplied. If the absolute value of Iq is increased, the drive voltage vector $R \cdot Iq$ is prolonged. As a result, in order that the armature voltage vector is held within the link voltage circle, a large canceling voltage vector $-\omega \cdot L \cdot |Id|$ having a direction opposite to that of drive voltage vector $R \cdot Iq$ must be produced by supplying the large reactive current Id in the negative direction.

Conversely, when the absolute value of the generated torque T may be decreased under the low load condition and the like, such a current Iq having a small absolute value may be required, and the drive voltage vector $R \cdot Iq$ may be shortened. As a result, the magnitude of the reactive current Id which is used to produce the canceling voltage vector $-\omega \cdot L \cdot |Id|$ may be reduced in the negative direction.

As a consequence, when an absolute value of the generated torque is large and |Iq| is large, Id must be increased in the negative direction. Conversely, when the absolute value of the generated torque is small and |Iq| is small, the reactive current Id may be decreased in the negative direction.

In the present invention, in order to realize such a relationship between Id and |Iq|, under a condition that a relative rotational speed of the armature and the field is constant, Id is increased in the negative direction in response to |Iq|.

As previously described, in accordance with the present invention, when |Iq| is small under the low load condition and the like, the magnitude of Id in the negative direction is suppressed to be small, and therefore it is possible to avoid that the waste reactive current Id is supplied. As a consequence, the generation of extra heat caused by the waste reactive current Id can be effectively suppressed. As a result, the additional compensating measure is not required in view of the maintenance management aspects of the motor, so that the construction of the motor can be simplified, and the motor can be manufactured at low cost. Also, the energy efficiency of the motor can be improved.

In the current control method according to the present invention, it is preferable that an absolute value of a synthetic current I which flows through the armature and is expressed by $I^2 = Id^2 + Iq^2$ be limited so that the absolute value does not exceed an allowable current value Imax in the armature.

When the absolute value |I| of the synthetic current I of the armature exceeds the predetermined allowable current value Imax, because the excessive load is given to the armature, heat may generate abnormally. In the worst case, there is a risk that the servomotor is destroyed.

In order to solve the above-mentioned problem, in accordance with the present invention, |I| is limited so that |I| does not exceed Imax. As a consequence, a condition of $|I| \leq Imax$ can be continuously maintained. As a result, it is possible to suppress that the excessive current flows through the armature, and the destruction of the motor can be prevented.

In the current control method according to the present invention, it is preferable that the Id and the Iq be defined so that a relationship of $Id = -|I| \cdot \sin \theta$ and $Iq = I \cdot \cos \theta$ are respectively satisfied with respect to the synthetic current I flowing through the armature and a phase angle $\theta$ which satisfies $0° \leq \theta < 90°$, and the phase angle $\theta$ is defined as an increase function of the relative rotational speed of the armature and the field.

In this case, when the relative rotational speed $\omega$ between the armature and the field is increased, back electromotive force $\omega \cdot \Phi$ having a large absolute value is generated in the armature. At the same time, in accordance with the present invention, the increase function $\theta$ of the speed $\omega$ is increased, so that the reactive current Id ($Id = -|I| \cdot \sin \theta$) is increased in the negative direction. As previously described, the large reactive current Id in the negative direction produces the large canceling voltage vector $-\omega \cdot L \cdot |Id|$ which is directed opposite to the back electromotive vector $\omega \cdot \Phi$ so as to cancel the large back electromotive force. As a consequence, it is possible to prevent the occurrence of the voltage saturation, and the servo control operation can be properly carried out in the servomotor.

It is assumed that under a condition that the relative rotational speed $\omega$ is constant, the functional form of $\theta$ is determined so that Id is increased in the negative direction in response to |Iq| as described above.

As a simple example, in a case where $\theta$ corresponds to such a function only of $\omega$, when $\omega$ is constant, $\theta$ is exclusively determined, and $Id = -|I| \cdot \sin \theta$, $|Iq| = |I| \cdot \cos \theta$ become such a function only of |I|. As a result, if |I| is increased in order to increase |Iq|, then Id is increased in the negative direction in response to this increase. Eventually, Id is increased in the negative direction in response to |Iq|.

Also, as another example, when $\theta$ is not only the function of $\omega$, but also the function $\theta(\omega, Iq)$ of Iq ($\propto$ torque T), even when $\omega$ is made constant, $\theta$ is changed as the function of Iq. At this time, under a condition that $\omega$ is constant, the functional form of $\theta(\omega, Iq)$ with respect to Iq is adjusted so that Id is increased in the negative direction in response to |Iq|.

Further, in the current control method according to the present invention, it is preferable that: Id and Iq be defined so that a relationship of $Id = -|Iq| \cdot \tan \theta$ is satisfied with respect to the phase angle $\theta$ which satisfies $0° \leq \theta < 90°$; and the phase angle $\theta$ be defined as an increase function of the relative rotational speed of the armature and the field.

Also, even in the present invention described above, when the relative rotational speed $\omega$ is increased, $\theta$ becomes large and the reactive current Id ($Id = -|Iq| \cdot \tan \theta$) is increased in the negative direction, so that a large canceling voltage vector is produced. As a consequence, even when the speed $\omega$ is increased and thus the large back electromotive force is produced, this large back electromotive force can be canceled, so that the occurrence of the voltage saturation can be effectively prevented.

It is assumed that under a condition that the relative rotational speed ω is constant, the functional form of θ is determined so that Id is increased in the negative direction in response to |Iq|. At this time, θ may be a one variable function only of ω, θ may be a two variable function of ω and Iq, or θ may be multiple-variable functions equal to or larger than one variable function and two variable function. More specifically, when θ is the one variable function only of ω, under a condition that ω is constant, θ is constant, and also, Id=−|Iq|·tan θ is automatically increased in the negative direction in response to |Iq|.

Subsequently, a description is made of a servomotor according to the present invention that can realize the above-mentioned current control method.

According to the present invention, there is provided a servomotor, including: an armature having armature windings of multiple phases; and a field, in which armature currents are supplied to the armature windings having the respective multiple phases to generate armature magnetic flux; and the armature and the field are relatively rotated with each other based on an interaction between the armature magnetic flux and field flux produced by the field to generate rotation force, in which: the servomotor further includes a current commander that outputs a q-axis command Iq* for generating torque and a negative d-axis current command Id* for preventing an occurrence of a voltage saturation as current commands with respect to the armature to which a dq conversion has been performed while a d-axis direction is a direction of the field flux; and the d-axis current command Id* is outputted so that, under a condition that a relative rotational speed of the armature and the field is constant, the d-axis current Id* is increased in a negative direction in response to a magnitude |Iq*| of the q-axis current.

In accordance with the present invention described above, under a condition that the relative rotational speed ω between the armature and the field is constant, Id* is outputted so that Id* is increased in the negative direction in response to |Iq*|. As a result, when |Iq*|(∝|T*|: note that T* is torque command) is small under the low load condition and the like, the magnitude of Id* in the negative direction is also small, and it is possible to properly avoid that the waste reactive current Id is supplied to the armature. As a consequence, the generation of extra heat caused by the waste reactive current Id can be effectively suppressed. As a result, the additional compensating measure is not required in view of the maintenance management aspects of the motor, so that the construction of the motor can be simplified, and the motor can be manufactured in low cost. Also, the energy efficiency of the motor can be improved.

In the servomotor according to the present invention, it is preferable that the current commander include: a synthetic current commander that outputs a synthetic current command I* of the armature; and a dq current commander that calculates and outputs Id* and Iq* from I* so that a relationship of $I^{*2}=Id^{*2}+Iq^{*2}$ is satisfied, and the synthetic current commander include a limiter that limits an absolute value of I* so that the absolute value of I* does not exceed an allowable current value Imax in the armature.

In accordance with the present invention, the absolute value |I*| of the synthetic current command I* of the armature is continuously limited to become equal to or smaller than the allowable current value Imax in the armature by the limiter, so that the absolute value |I| of the synthetic current I which is supplied to the armature based on the current command I* does not exceed Imax. As a result, it is possible to properly avoid that the excessive current flows through the armature, and the destruction of the servomotor can be prevented.

Further, it is preferable that: the servomotor according the present invention include a speed sensor that measures a speed of the relative rotation motion; and, in the servomotor, the current commander includes: a synthetic current commander that outputs a synthetic current command I* of the armature; and a dq current commander that calculates a phase angle θ which satisfies 0°≦θ<90° from a speed measured by the speed sensor as an increase function with respect to the measured speed, and calculates and outputs Id* and Iq* from I* so that a relationship of Id*=−|I*|·sin θ and Iq*=I*·cos θ are respectively satisfied.

In this structure, the dq current commander calculates the phase angle θ from the rotational speed ω measured by the speed sensor, and calculates Id* and Iq* based on the phase angle θ and the synthetic current command I* entered from the synthetic current commander.

In this case, when the speed ω is increased, back electromotive force ω·Φ is generated in the armature. At the same time, in accordance with the present invention described above, the phase angle θ as the increase function of the speed ω is increased, so that the reactive current Id*(Id*=−|I*|·sin θ) is increased in the negative direction. As previously described, the large reactive current Id in the negative direction supplied to the armature based on the reactive current instruction Id* produces the large canceling voltage vector−ω·L·|Id| which is directed opposite to the back electromotive vector ω·Φ so as to cancel the large back electromotive force. As a consequence, according to the present invention, it is possible to prevent the occurrence of the voltage saturation, and the serve control operation can be properly carried out in the servomotor.

Further, it is preferable that: the servomotor according the present invention include a speed sensor that measures a speed of the relative rotation motion; and, in the servomotor, the current commander includes: a provisional synthetic current commander that outputs a provisional synthetic current command I*; and a dq current commander that calculates a phase angle θ which satisfying 0°≦θ<90° from a speed measured by the speed sensor as an increase function with respect to the measured speed, and calculates and outputs Id* and Iq* so that a relationship of Id*=−|I*|·tan θ and Iq*=I* are respectively satisfied with respect to I*.

Even in the present invention described above, if the rotational speed ω is increased, θ functioning as the increase function of ω becomes large, and the reactive current command Id*(Id*=−|I*|·tan θ) is increased in the negative direction. As a result, a large canceling voltage vector having a direction opposite to that of the back electromotive force is produced by the reactive current Id which is supplied to the armature based on this reactive current command Id*. Accordingly, even when the speed ω is increased and thus the large back electromotive force is produced, this large back electromotive force can be canceled, so that it is possible to prevent the occurrence of the voltage saturation.

In the servomotor according to the present invention, it is preferable that the current commander include a limiter that limits an absolute value of a synthetic current Is* of the armature so that an absolute value of the synthetic current Is* which is expressed by $Is^{*2}=Id^{*2}+Iq^{*2}=I^{*2}·(1+\tan^2\theta)$ does not exceed an allowable current value Imax of the armature.

In accordance with the present invention described above, the absolute value |Is*| of the synthetic current command of the armature is continuously limited to become equal to or smaller than the allowable current value Imax in the armature by the limiter, so that the absolute value |Is| of the synthetic current Is (note that $Is^2=Id^2+Iq^2$) which is supplied to the armature based on the current command Is* does not exceed Imax. As a result, it is possible to properly avoid that the excessive current flows through the armature, and the destruction of the servomotor can be prevented.

BRIEF DESCRIPTION OF DRAWINGS

FIG. 6 A schematic diagram for representing a condition of changes of a q-axis current comment Iq* and a phase angle "θ" with respect to a motor rotational speed "ω" in the servomotor according to a second embodiment.

EXPLANATION OF CODES

Figure 1:
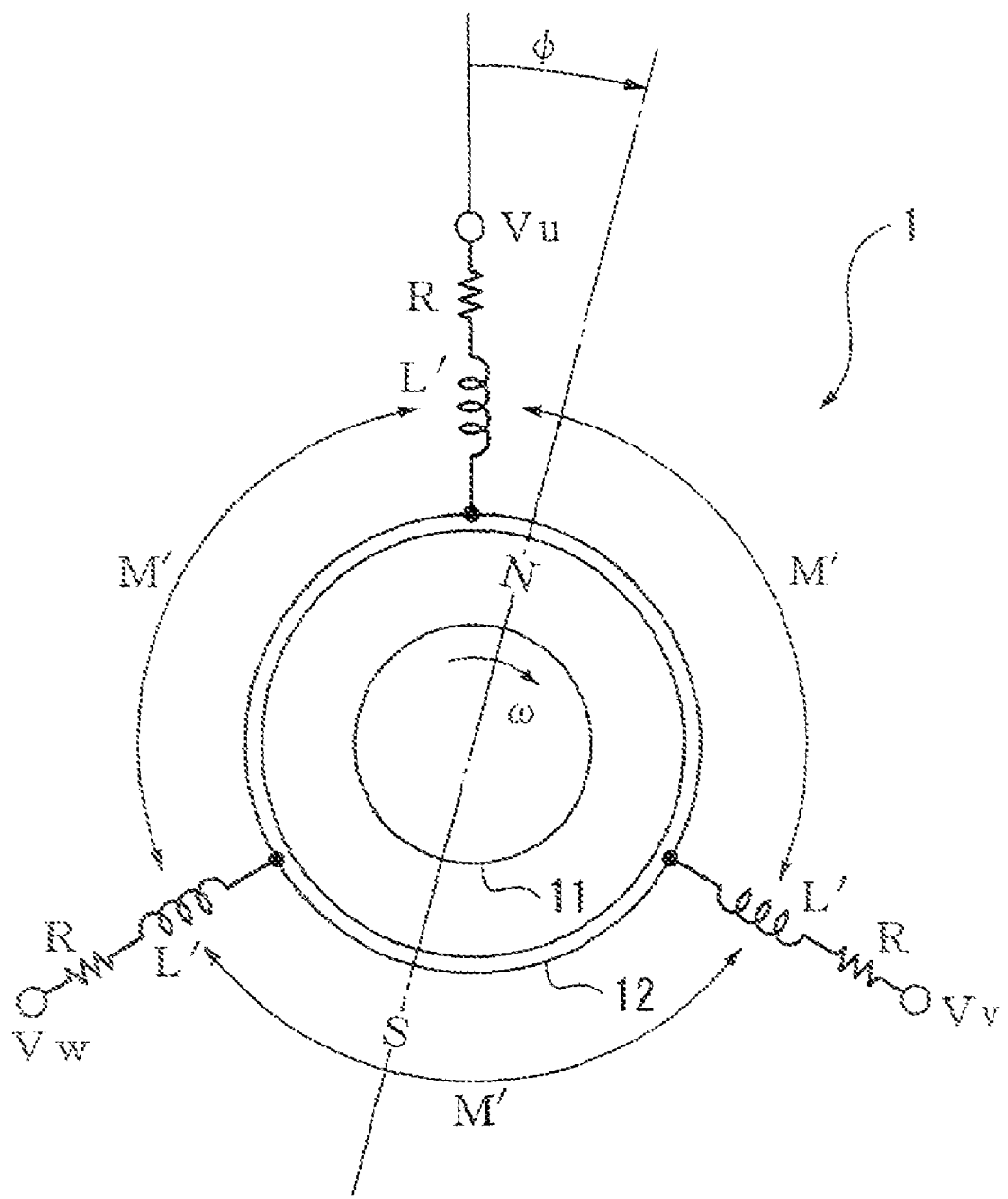
FIG. 1 An equivalent circuit diagram of a servomotor according to a first embodiment of the present invention.

1 . . . servomotor
11 . . . field
12 . . . armature
25 . . . speed controller
26 . . . calculator
32 . . . speed sensor
251 . . . limiter
261 . . . limiter
Id . . . d axis current (reactive current)
Iq . . . q axis current (active current)
Id* . . . d axis current command (reactive current command)
Iq* . . . q axis current command (active current command)
θ . . . dq phase angle

BEST MODE FOR CARRYING OUT THE INVENTION

Referring now to drawings, embodiments of the present invention will be described.

First Embodiment

FIG. 1 is an equivalent circuit diagram of a servomotor 1 according to a first embodiment of the present invention.

The servomotor 1 is a three-phase synchronous motor including a field 11 constructed by a permanent magnet, and an armature 12 having three phases (u phase, v phase, w phase) of armature windings. The field 11 is provided as a freely rotatable rotor. When AC currents (armature currents) whose phases are different from each other by 120 degrees are supplied to the respective phases of the armature 12 being a stator, armature magnetic flux can be generated. This armature magnetic flux is rotated at the same frequency as that of the AC current. Since the field 11 receives such a magnetic force which may cause its field flux to be in parallel with the rotating armature magnetic flux, the field 11 is rotated while the field 11 follows the rotating armature magnetic flux (rotation angle "φ", and rotation angular velocity "ω"=dφ/dt. It is assumed that ω≧0 if there is no specific comment). In the servomotor 1, rotation force is generated in the above-mentioned manner.

It should be noted that in FIG. 1, reference symbols Vu, Vv, Vw indicate armature voltages of the respective phases of the armature 12, reference symbol R indicates a resistance value which is commonly applied to the respective phases, reference symbol L' represents a self-inductance which is commonly applied to the respective phases, and reference symbol M' indicates a mutual inductance which is commonly applied to the respective phases. It should be noted that the rotation angle "φ" of the field 11 is defined by an angle formed by a direction of the field flux (namely, direction for connecting N pole to S pole of field 11) and a forming direction of the u phase of the armature 12.

Figure 2:
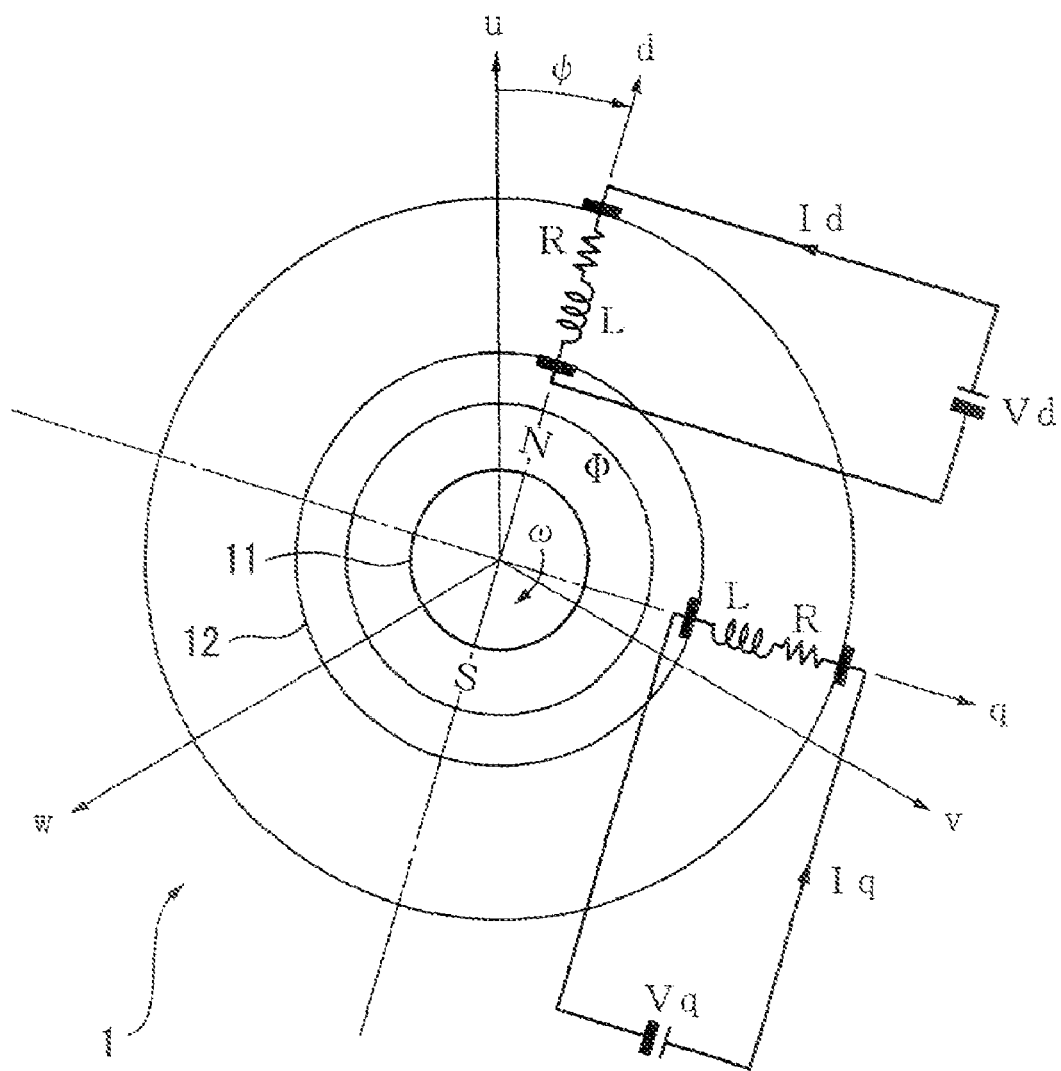
FIG. 2 An equivalent circuit diagram obtained by subjecting the servomotor according to the first embodiment to dq conversion.

When the servomotor 1 of FIG. 1 is subjected to dq conversion, an equivalent circuit of FIG. 2 is obtained.

In FIG. 2, a d axis is coincident with the direction of the field flux, and a q axis is formed in a direction perpendicular to the d axis. The armature windings of the three phases (u phase, v phase, w phase) of FIG. 1 have been converted into armature windings of two phases including the d phase and the q phase.

In this drawing, Vd, Vq indicate armature voltages of the respective phases, Id, Iq indicate armature currents of the respective phases, R indicates a resistance value which is commonly applied to the respective phases, L indicates a self-inductance which is commonly applied to the respective phases, and Φ indicates a synthetic magnetic flux which is intersected with the armature windings of the respective phases. The respective amounts satisfies a circuit equation which is expressed in the following equation 1, which is generally known as a synchronous motor:

$$\begin{bmatrix} Vd \\ Vq \end{bmatrix} = \begin{bmatrix} R+PL & -\omega L \\ \omega L & R+PL \end{bmatrix} \begin{bmatrix} Id \\ Iq \end{bmatrix} + \begin{bmatrix} 0 \\ \omega \cdot \Phi \end{bmatrix} \quad \text{[Equation 1]}$$

In this equation, P indicates a differential operator d/dt. A second term of a right side of the equation shows back electromotive force which is induced by windings of the respective dq phases. As a consequence, it can been understood that back electromotive force ω·Φ caused by Φ is induced only in the winding of the q phase.

In FIG. 2, a current which generates rotation torque T of the servomotor 1 is a q-axis current Iq which is intersected perpendicular to the field flux in the d-axis direction, specifically, T∝Φ·Iq. In contrast, the d-axis current Id is a reactive current which does not generate the torque T. However, as disclosed in Patent Document 1, if the negative reactive current Id is supplied, a cancel voltage component which cancels back electromotive force can be produced, and thus, it is possible to prevent an occurrence of a voltage saturation in the servomotor 1.

Figure 3:
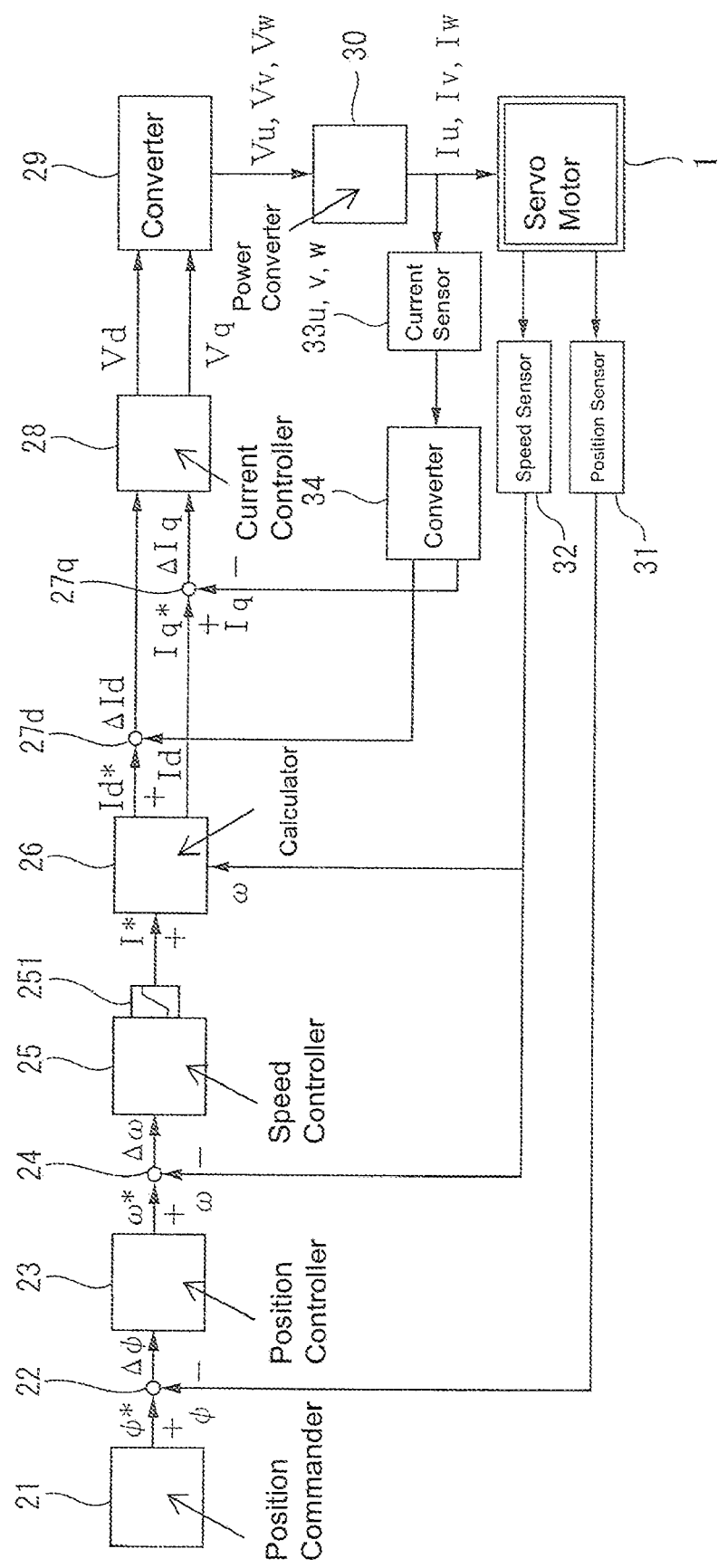
FIG. 3 A feedback control block diagram in the servomotor according to the first embodiment.

FIG. 3 is a feedback control block diagram in the servomotor 1 shown in FIG. 1 and FIG. 2.

A position commander 21 outputs a command value φ* of a rotation angle (rotation angle φ of field 11) of the servomotor 1 in accordance with a predetermined part program, and the like. The angle command φ* is compared with an actual rotation angle φ measured by a position sensor 31 in a position comparator 22, and angle deviation Δφ=φ*−φ thereof is entered to a position controller 23. The position controller 23 functioning as a speed commander performs a predetermined calculation based on the angle deviation Δφ so as to calculate a command value ω* of the rotational speed of the servomotor 1, and then, outputs the calculated command value ω*. The speed command ω* is compared with an actual rotational speed ω measured by a speed sensor 32 in a speed comparator 24, and then, speed deviation Δω=ω*−ω thereof is entered to a speed controller 25. The speed controller 25 functioning as a synthetic current commander of the present invention performs a predetermined calculation based on the speed deviation Δω so as to calculate a command value I* of a synthetic current in the armature 12 of the servomotor 1, and then, outputs the calculated current command value I*. The synthetic current command I* is directly inputted to a calculator 26. It should be noted that the speed controller 25 includes a limiter 251. As described later in detail, the limiter 251 monitors the synthetic current command I* based on a preset upper limit value I*max of the synthetic current command, and limits the current so that an absolute value |I*| of the synthetic current command does not exceed the upper limit value I*max.

Then, the calculator 26 calculates a dq current phase angle θ based on the speed ω measured by the speed sensor 32. In this case, it is assumed that while the angle θ is defined as one variable function θ(ω) of ω, a functional form of this angle θ is prestored in the calculator 26. The calculator 26 substitutes ω entered from the speed sensor 32 into the function θ(ω), and outputs the calculation result thereof as a dq current phase angle. As described later in detail, the function θ(ω) is changed as an increase function of the speed ω, and $0° \leq θ(ω) < 90°$.

The calculator 26 functioning as the dq current commander of the present invention calculates a d-axis current command Id* and a q-axis current command Iq*, which are expressed by $Id^* = -|I^*|·\sin θ$, and $Iq^* = I^*·\cos θ$, respectively, based on the phase angle θ calculated in the above and the synthetic current command I* inputted from the speed controller 25, and then outputs the calculated current commands. A relative equation of $I^{*2} = Id^{*2} + Iq^{*2}$ is established among I*, Id*, and Iq*.

It should be noted that the speed controller 25 and the calculator 26 constitute the current commander of the present invention, which calculates the current commands of the armature 12 from the speed deviation Δω to output the calculated current commands.

The d-axis and q-axis current commands Id* and Iq* are compared with the actual d-axis and q-axis currents Id and Iq in the servomotor 1 in d-axis and q-axis current comparators 27d and 27q, respectively, so that the respective d-axis and q-axis current deviation ΔId=Δd*−Id, and ΔIq=Iq*−Iq are inputted to a current controller 28. In this case, the respective d-axis and q-axis currents Id and Iq which are inputted to the current comparators 27d and 27q respectively are such currents obtained by the currents Iu, Iv, Iw of the respective phases of the three-phase servomotor 1 (before dq conversion: refer to FIG. 1) are measured by current sensors 33u, 33v, 33w for the respective phases, and then, these measured currents are converted into d-axis and q-axis currents Id, Iq of two phases by a three-phase/two-phase converter 34.

Next, the current controller 28 into which the respective d-axis and q-axis current deviation ΔId and ΔIq performs a predetermined calculation based on these inputted current deviation so as to calculate a d-axis voltage Vd and a q-axis voltage Vq, and then, outputs the calculated respective axis voltages Vd and Vq.

The two-phase/three-phase converter 29 performs a calculation based on the inputs of these voltages Vd and Vq, and then, outputs calculated three-phase voltages Vu, Vv, Vw to a power converter 30.

The power converter 30 outputs via a power supply apparatus (not shown) three-phase currents Iu, Iv, Iw which correspond to the three-phase voltages Vu, Vv, Vw so as to supply these three-phase currents Iu, Iv, Iw, to the respective three phases u, v, w of the armature 12 of the servomotor 1.

In the servomotor 1, positions, speeds, and currents thereof are properly controlled by a feedback loop which is equipped with the above-mentioned arrangement. Instead of such a detecting operation that the rotational speed ω is detected by the speed sensor 32, the rotational speed ω may be calculated by employing a difference component of the detected positions φ for each of sampling periods in the position sensor 31.

Subsequently, a detailed description is made of a current control method according to the first embodiment with reference to FIG. 4. It should be noted that the speed controller 25 and the calculator 26 shown in FIG. 3 concretely realize the following current control method.

Figure 4:
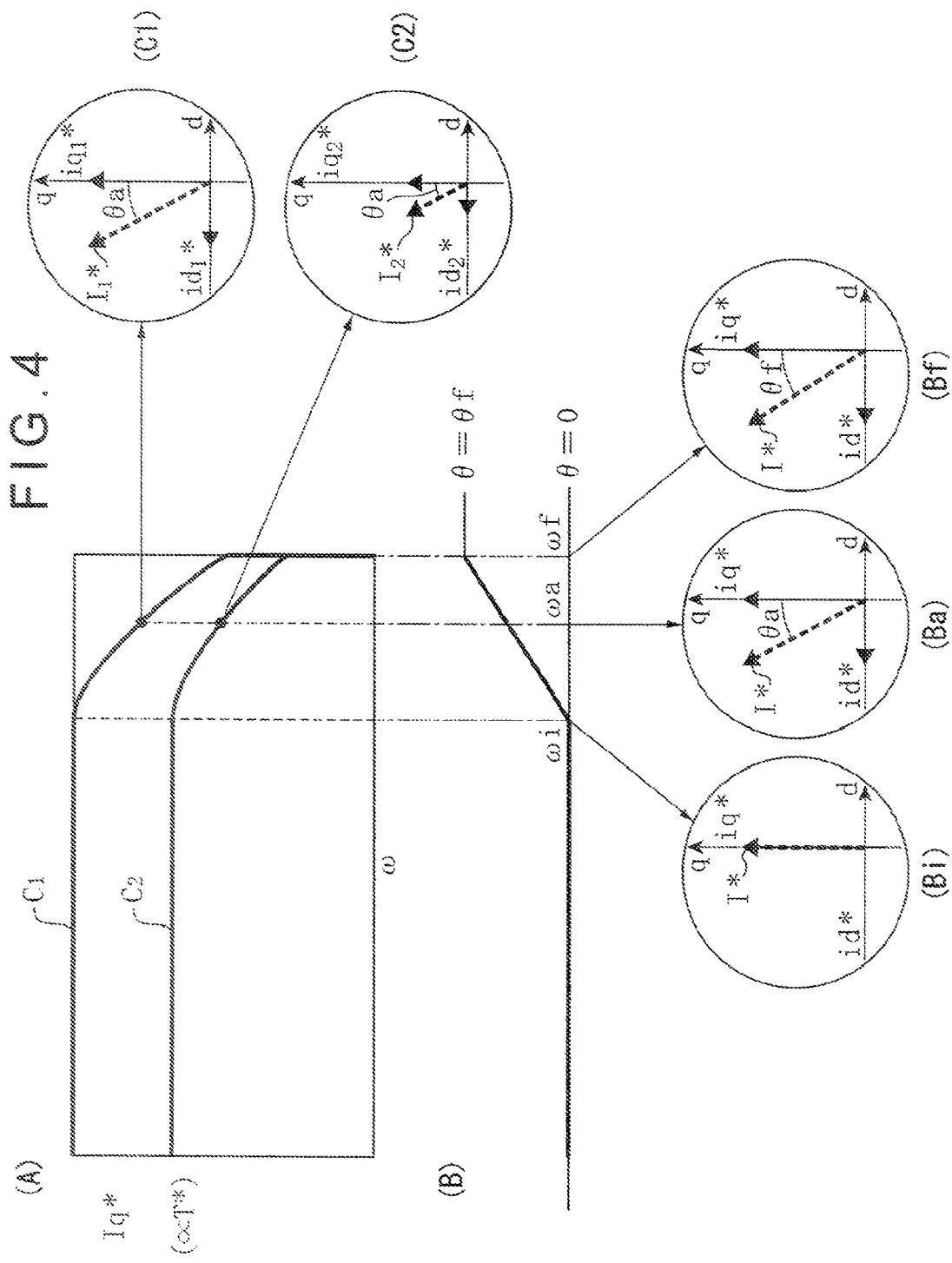
FIG. 4 A schematic diagram for representing a condition of changes of a q-axis current comment Iq* and a phase angle "θ" with respect to a motor rotational speed "ω" in the servomotor according to the first embodiment.

FIG. 4 is a diagram for representing conditions of changes of the q-axis current command Iq* and the phase angle θ with respect to the motor rotational speed ω in such a case where the synthetic current command I* outputted from the speed controller 25 is constant. In this case, such an assumption that I* is constant is equivalent to another assumption that the speed deviation Δω of FIG. 3 is constant. Under the actual servo control condition, Δω is varied time to time. As a result, it should be noted that such an opportunity that the above-mentioned assumption is established is limited only to an extremely rare case. As a consequence, the above-mentioned assumption is merely set for the sake of simple descriptions. In order to more preferably indicate effects of the first embodiment, FIG. 4 indicates such a case where $I^* \geq 0$, and $ω \geq 0$.

A portion (A) of FIG. 4 is a graph in which an ordinate shows Iq* and an abscissa indicates a rotational speed ω. As previously described, since Iq* has a direct proportional relationship ($T^* \propto Φ·Iq^*$) with respect to the torque command T* of the motor, the ordinate may be observed as the torque command T*. Respective curved lines $C_1$ and $C_2$ indicated in the portion (A) of FIG. 4 are expressed with respect to a synthetic current command $I_1^*$ and another synthetic current command $I_2^* (I_1^* > I_2^*)$, which are different from each other.

A portion (B) of FIG. 4 is a diagram in which an ordinate shows a phase angle θ, and an abscissa indicates a rotational speed ω. This drawing may be regarded by that a functional form θ(ω) of θ previously stored in the calculator 26 is expressed.

Within a range where $0 \leq ω \leq ωi$ is established, $θ(ω)=0$ is established. A d-axis current control starting speed ωi corresponds to such a rotational speed at a time instant when the reactive current Id starts to flow. It is assumed that an optimum value has been previously set to the d-axis current control starting speed ωi in such a viewpoint that a voltage saturation is effectively suppressed.

Within a range where $ωi \leq ω \leq ωf$ is established, θ(ω) is increased in a linear manner. Assuming now that θ(ω) when ω=ωf is established is equal to θf, a concrete expression equation is given by $θ(ω)=θf+θf·(ω−ωf)/(ωf−ωi)$. A portion (Bi), a portion (Ba), and a portion (Bf) of FIG. 4 are vector diagrams, respectively, which represent a relationship among I* (either $I_1^*$ or $I_2^*$), Id*, and Iq* when ω=ωi, ω=ωa (arbitrary value), and ω=ωf, respectively. In these diagrams, the phase angle θ is expressed as θi(=0), θa, and θf.

As previously described, the phase angle θ(w) is defined as an increase function of the rotational speed (velocity) ω within the range where $0 \leq ω \leq ωf$ is established.

A case where the rotational speed ω is gradually increased from 0 will be considered. Within the range where $0 \leq ω \leq ωi$ is established, since θ=0 is established, Id*=−|I*|·sin θ=0, and Iq*=I*·cos θ=I* are established. As a consequence, the current command outputted from the calculator 26 is given only for the q-axis direction, and at this time, the reactive current Id does not flow through the servomotor 1. This is because, if the region is such a region where the rotational speed ω is low, then back electromotive force ω·Φ in the above-mentioned equation 1 is small. As a result, even when the reactive current Id does not flow, the voltage saturation does not occur.

If the rotational speed ω is increased and is entered in the range where ωi≦ω<ωf is established, θ(ω)≠0(>0) is established, so that a d-axis current control is carried out. In other words, the respective d-axis and q-axis currents Id and Iq are supplied to the armature 12 based on the respective d-axis and q-axis current commands which satisfies Id*=−|I*|·sin θ=−I*·sin θ, and Iq*=Iq*·cos θ, respectively. The reactive current Id produces the above-mentioned canceling voltage vector −ω·L·|Id|, and cancels the back electromotive force vector ω·Φ so as to prevent an occurrence of a voltage saturation. In particular, since the phase angle θ is defined as the increase function of the rotational speed ω, if the rotational speed ω is increased, the reactive current command Id* (Id*=−|I*|·sin θ) is increased in the negative direction, and thus, the large reactive current Id is supplied in the negative direction. When ω is large, the back electromotive force vector becomes large. At the same time, since a large canceling voltage vector is produced based on the large reactive current Id in the negative direction, the occurrence of the voltage saturation can be effectively prevented.

Subsequently, a description is made of the respective d-axis and q-axis current commands Id* and Iq* under a condition that the rotational speed ω is fixed to one arbitrary value ωa within a range where ωi≦ω≦ωf is established. Since ω is fixed to the arbitrary value ωa, the phase angle θ as one variable function of ω is exclusively determined, and has a constant value θa under the condition defined above.

A portion (C1) of FIG. 4 is a diagram for showing a d-axis current command $Id_1^*$ and a q-axis current command $Iq_1^*$ when $I^*=I_1^*$ is established (curved line $C_1$), and ω=ωa. A portion (C2) of FIG. 4 is a diagram for showing a d-axis current command $Id_2^*$ and a q-axis current command $Iq_2^*$ when $I^*=I_2^*$ is established (curved line $C_2$), and ω=ωa is established. In this case, $Id_1^*=-|I_1^*|\cdot\sin θ=-I_1^*\cdot\sin θ<0$:-d-axis direction (i=1, 2), is established.

In the portion (C1) and portion (C2) of FIG. 4, since the rotational speed ωa is common therebetween, the phase angle θa is also common therebetween. Accordingly, $Id_1^*(Id_1^*=-I_1^*\cdot\sin θa)$, and $|Iq_1^*|(|Iq_1^*|=I_1^*\cdot\cos θa)$ are determined based on the synthetic current command $I_1^*$. In this case, since $I_1^*>I_2^*$, $-Id_1^*>-Id_2^*$ and further $|Iq_1^*|>|Iq_2^*|$. As a consequence, Id* is increased in the negative direction in response to |Iq*| under a condition that the rotational speed ω is constant (=ωa). This fact may also be easily understood from the following equation which is obtained from the above-mentioned respective equation, that is, Id*=−|Iq*|·tan θa (∵θa=constant).

As previously described in detail, when Iq (∝T) is small, for example, under low load condition, the above-mentioned drive voltage vector R·Iq is small. As a result, there is no need to supply a large reactive current Id in the negative direction in order to avoid the voltage saturation. In the first embodiment, since Id* is increased in the negative direction in response to |Iq*| (under condition of constant ω), when |Iq*| is small, the magnitude of Id* in the negative direction can be decreased, and thus, it is possible to avoid that the waste reactive current Id is supplied. As a consequence, because the generation of extra heat caused by waste reactive current Id can be effectively suppressed, the additional compensating measure for the servomotor 1 of the maintenance matter is no longer required. As a result, the construction of the servomotor 1 can be made simpler, and further, the servomotor 1 can be manufactured in low cost. Also, the energy efficiency of the servomotor 1 can be improved.

In FIG. 4, the description was made of a condition where I*≧0 and ω≧0 are established. It should be noted that the above description may be substantially directly applied to such a case where a rotation status of the servomotor 1 is the reverse to FIG. 4, namely in the case where I*≦0 and ω≦0 are established.

Figure 5:
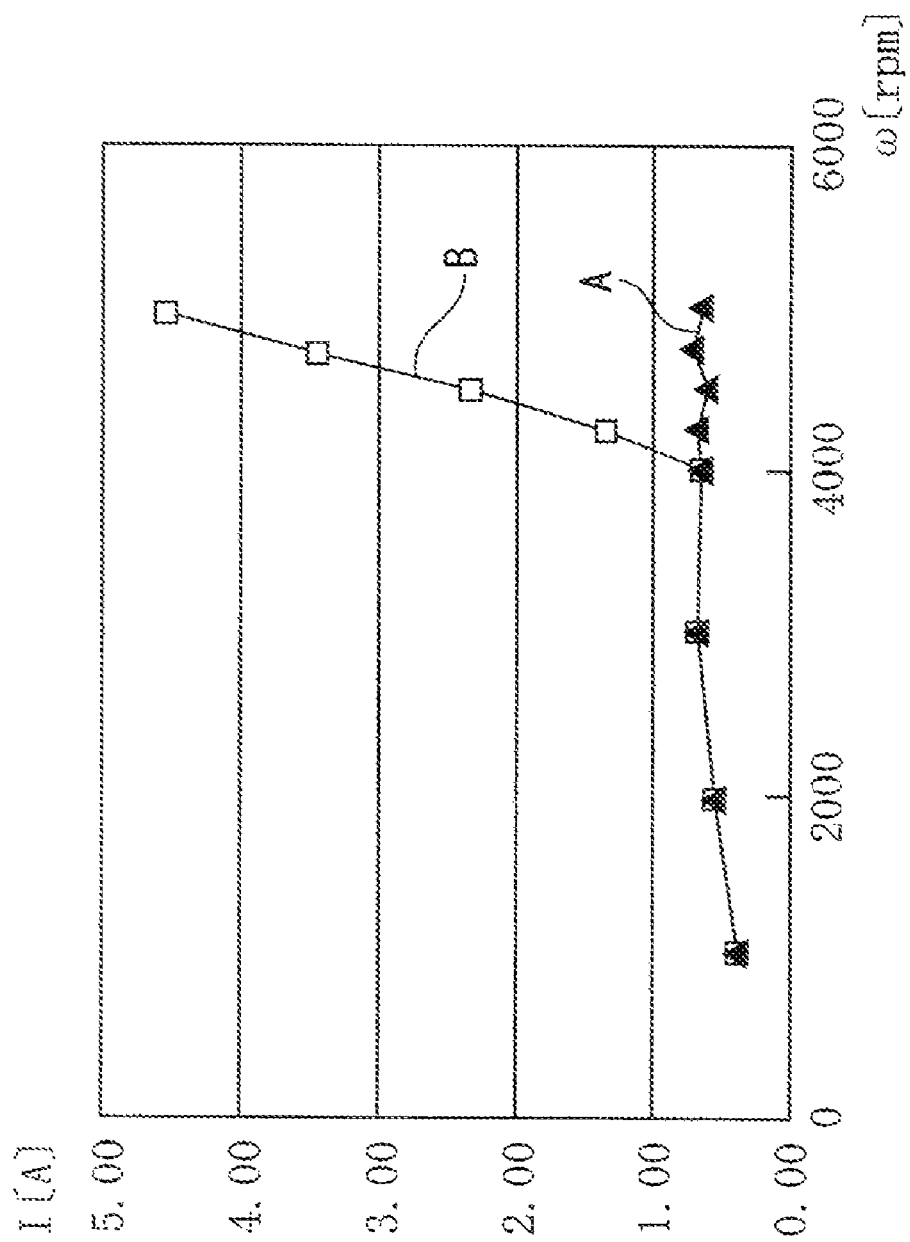
FIG. 5 A diagram for showing changes in currents of armatures under no load condition with respect to both the servomotor according to the first embodiment and the conventional servomotor.

Next, FIG. 5 is a diagram for representing changes in currents of the armature under no load condition (torque T≈0) with respect to both the servomotor 1 of the first embodiment and the servomotor of Patent Document 1. It should be noted that a plotted line A shows a change of currents of the first embodiment, and a plotted line B indicates a change of currents of Patent Document 1. In this drawing, at a time of ω=400 [rpm], a d-axis current control is commenced of any of these servomotors. As can be readily read from this drawing, after the d-axis current control is commenced, the armature current in the servomotor of Patent Document 1 is rapidly increased. This is because, although the reactive current need not be supplied due to the no load condition, such a reactive current (∝ω) is supplied which is exclusively determined in response to the rotational speed ω. On the other hand, in the servomotor 1 of the first embodiment, there is no change in the armature currents even after the d-axis current control is commenced (ω≧4000 [rpm]). This is because, because of the no load condition, the torque need not be generated, so that the synthetic current command I* from the speed controller 25 becomes substantially zero. As a result, Id*=−|I*|·sin θ (≈0 is established), and thus, the reactive current Id does not flow through the armature 12.

FIG. 5 indicates the current changes in such an extreme case that no load is loaded (torque T≈0). It is possible to readily predict a condition of armature currents when a low load is loaded. It should be noted that since the magnitudes of the q-axis currents Iq for generating the torque are substantially equal to each other in both the servomotors, this influence is neglected in the comparison of both the servomotors.

In the servomotor of Patent Document 1, since the reactive current Id is supplied which is exclusively determined by the rotational speed ω irrespective of low and high load conditions, a condition of changes in armature currents is substantially equal to that of FIG. 5 under no load condition (strictly speaking, reactive current is "increased" by component of q-axis current Iq).

On the other hand, in the servomotor 1 of the first embodiment, the reactive current command Id*=−|I*|·sin θ is calculated by the calculator 26 based on the synthetic current command I* having the magnitude in response to the generated torque, and then, the reactive current Id is supplied to the armature 12 in response to this calculated reactive current command. Since the absolute value of the synthetic current command I* is outputted as a relatively small value under the low load condition, the magnitude of the supplied reactive current Id in the negative direction becomes smaller than that of the reactive current Id in Patent Document 1. This is because the magnitude of the reactive current Id in Patent Document 1 is set to the relatively large magnitude in the negative direction in order that the occurrence of the voltage saturation can be avoided even under high load conditions.

As previously described, in accordance with the servomotor 1 of the first embodiment, the armature current under the low load condition (including no load condition) can be decreased, so that the generation of the extra heat can be prevented.

It should be noted that in the portion (A) of FIG. 4, Iq* (Iq*=I*·cos θ) is simply decreased due to the factor cos θ in the range where $\omega i \leq \omega \leq \omega f$ is established. This implies that the torque command T* in the servomotor 1 is decreased. Therefore, it may be seen that the torque T generated when the motor is rotated in a high speed ($\omega \geq \omega i$) becomes small. However, this is because the portion (A) of FIG. 4 is expressed under such a virtual condition that the synthetic current command I* is constant. In an actual servo control operation in which the synthetic current command I* is varied, as described below, there is no problem that the generated torque T is decreased.

When the rotational speed ω becomes larger than ωi and the d-axis current control is commenced, as indicated in the portion (A) of FIG. 4, the torque command T* (∝Iq*) is temporarily decreased. As a result, the torque T generated in the servomotor 1 is temporarily decreased, and in response to this, for example, the rotational speed ω is temporarily decreased. This implies that ω becomes small, which is inputted to the speed comparator 24 of FIG. 3. As a result, the speed deviation Δω (Δω=ω*−ω) outputted from the speed comparator 24 is increased. In FIG. 3, the speed controller 25 calculates a larger synthetic current command I* based on the increased Δω, and outputs the calculated larger synthetic current command I*. As a result, the q-axis current command Iq* (∝T*) which is calculated based on the increased I* is also increased, so that the torque command T* is increased. As a result, since the generated torque T is increased, the rotational speed ω which has been temporarily decreased as described above may be recovered to the substantially original rotational speed. Also, the increased component of the torque command T* may cancel the temporarily decreased component of the torque T*. As a result, when the motor is rotated in high speed, it is possible to suppress the decrease of the torque command T* under a condition that the d-axis current control is carried out.

The synthetic current command I* which is expressed by $I^{*2}=Id^{*2}+Iq^{*2}$ is to command the armature synthetic current I which is expressed by $I^2=Id^2+Iq^2$. As shown in FIG. 3, the synthetic current command I* is calculated from the speed deviation Δω in the speed controller 25, and then, is outputted to the calculator 26. In this case, the absolute value |I*| is designed so as not to exceed the upper limit value I*max due to the effect of the limiter 251. In this case, the upper limit value I*max is set as such a value which is equal to a maximum allowable amount Imax of the synthetic current in the armature 12. As a result, assuming a case where |I*|>I*max is established, there is a possibility that such a synthetic current I exceeding the maximum allowable amount Imax flows through the armature, which causes abnormal heat generations and motor destruction. In the first embodiment, the limiter 251 continuously limits I* to satisfy a condition in which: |I*|≦I*max is established. As a result, such a synthetic current exceeding Imax does not flow through the armature 12, so that the abnormal heat generation and the motor destruction can be properly prevented.

More specifically, when an absolute value of the synthetic current command I* calculated by the speed controller 25 exceeds I*max, the limiter 251 outputs a corrected current command I*r which is previously stored in the calculator 26 instead of this synthetic current command I*. In this case, the corrected current command I*r may be selected from an arbitrary numeral value which can satisfy |I*r|≦I*max. In the most preferable case, this corrected current command I*r is selected from the maximum value thereof, namely |I*r|=I*max is satisfied, in such a view point that the torque T generated in the motor is kept large.

On the other hand, conventionally, for example, in Patent Document 1, while the reactive current Id is defined as a one variable function of the rotational speed ω, the reactive current Id is supplied which is exclusively determined based on ω irrespective of high/low motor load conditions. However, under the low load condition, such a reactive current having an absolute value approximately equal to that under the high load condition need not be supplied. On the contrary, there is a problem that a synthetic current flowing through an armature is unwantedly increased. Also, if this synthetic current is increased to exceed the maximum allowable amount, as previously described, a problematic abnormal heat generation may occur.

Meanwhile, in accordance with the present invention, the magnitude of the reactive current Id in the negative direction is suppressed to become a small reactive current under the low load condition, so that the synthetic current I is also not increased. In the first embodiment, as previously described, the limiter 251 limits the absolute value of the synthetic current I so that this absolute value does not exceed the maximum allowable amount Imax. Even if the limiter 251 is not provided, the absolute value of the synthetic current I under the low load condition can be decreased. As a result, such a possibility that the absolute value |I| exceeds the maximum allowable amount Imax becomes lower, and thus, the servomotor 1 can be driven safely under low load condition.

Second Embodiment

Subsequently, a description is made of a second embodiment of the present invention.

Descriptions of items which have already been described in the first embodiment will be omitted. Accordingly, the same reference numerals shown in the first embodiment will be employed as those for denoting the same, or corresponding structural elements, and descriptions thereof will be omitted, or will be simply made.

In this second embodiment, the limiter 251 shown in FIG. 3 is not provided. Since the limiter 251 is not employed, a provisional current command I* from the speed controller 25 functioning as a provisional current commander of the present invention is directly entered to the calculator 26. It should be noted that the current command I* has been called as the "synthetic" current command in the first embodiment. In contrast, in the second embodiment, as described later, because I* does not command the synthetic current of the armature 12, such an expression "provisional" is used instead of the expression "synthetic", so that a "provisional current command" is used to call I*. In this case, the reason why the expression "provisional" is used is given from the consideration of the following fact. That is I* corresponds to such a provisional current command of a prestage, which is employed in order to produce Id* and Iq* corresponding to the direct current command with respect to the armature 12.

In the calculator 26, a dq current phase angle θ is previously calculated based on the rotational speed ω measured by the speed sensor 32. It should be noted that while the dq current phase angle θ is defined as a one-variable function θ(ω) of ω, a functional form of this phase angle θ is identical to that shown in the portion (B) of FIG. 4.

The calculator 26 calculates both a d-axis current command Id* and a q-axis current command Iq*, which are expressed by Id*=−|I*|·tan θ, and Iq*=I*, respectively based on this phase angle θ and the provisional current command I* entered from the speed controller 25.

A limiter 261 (not shown) is provided in the calculator 26, and limits an absolute value of a synthetic current command Is*(≠I*) so that this absolute value does not exceed an upper limit value Is*max. This synthetic current command Is* is expressed as $Is^{*2}=Id^{*2}+Iq^{*2}=I^{*2}\cdot(1+\tan^2\theta)$. In this case, the above-mentioned upper limit value Is*max has the same value as the upper limit value I*max of the first embodiment, and is equal to the maximum allowable amount Imax of the synthetic current in the armature 12.

The limiter 261 calculates Is* based on the calculated Id* and Iq*, and compares an absolute value |Is*| of Is* with Is*max.

When |Is*|≦Is*max is established, the limiter 261 judges that the respective dq axis current commands Id* and Iq* are proper, and then, directly outputs those current commands to the respective dq axis current comparators 27d and 27q.

On the other hand, when |Is*|>Is*max is established, if the respective dq axis currents Id and Iq based on Id* and Iq* which give Is* are supplied to the armature 12, then it becomes that the absolute value |Is| of the synthetic current is larger than the maximum allowable amount Imax, which may cause a problem such as abnormal heat generations. As a result, the limiter 261 judges that Id* and Iq* are not proper. As a consequence, the limiter 261 outputs Id*=−Is*max·sin θ, and Iq*=±Is*max·cos θ, as corrected current commands of the respective d axis and q axis to the respective d-axis and q-axis current comparators 27d and 27q. It should be noted that symbol "±" given to a right side of the equation of Iq* indicates that a symbol of Iq* is properly selected in response to a direction of torque generated in the motor 1, and then, the selected symbol is outputted. Also, at this time, $Is^{*2}=Id^{*2}+Iq^{*2}=Is^{*}\text{max}^2$ is established.

In any of the above-mentioned cases, the absolute value of the synthetic current Is flowing through the armature 12 becomes such a current value equal to smaller than the maximum allowable amount Imax. As a result, while an abnormal heat generation does not occur, the servomotor 1 can be driven safely.

Subsequently, a description is made of a current control method according to the second embodiment with reference to FIG. 6.

Reference symbol "C" contained in a portion (A) of FIG. 6 is a graph for representing a condition of changes of the q-axis current command Iq* with respect to the rotational speed ω (>0) under a condition that the provisional current command I* (>0) is constant. In the second embodiment, since Iq*=I* is established, Iq* is also constant under a condition that I* is constant. This is different from the first embodiment. That is, in the portion (A) of FIG. 4 of the first embodiment, when the d-axis current control is carried out (ωi≦ω≦ωf), Iq* is decreased.

As previously described in detail in the first embodiment, when ω is increased under the d-axis current control condition, both Iq* and T*(∝Iq*) are temporarily decreased, and thus, the output torque T is temporarily lowered. However, in the second embodiment, since both Iq* and T* are constant, the torque T can be stably outputted.

As is well indicated in a portion (C) of FIG. 6, the d-axis current command Id* is outputted so as to establish Id*=−|I*|·tan θ (≦0:−d-axis direction). In connection with an increase of ω, (ωa→ωb)θ is increased (θa→θb), Id* is increased in the negative direction. If ω is large, then back electromotive force generated in the armature 12 is also increased. In connection with the increased back electromotive force, the reactive current Id can be increased in the negative direction. As a result, an occurrence of a voltage saturation can be effectively prevented.

It should be noted that the present invention is not limited only to the above-mentioned embodiments, but modifications, improvements, and the like within such a scope that the object of the present invention can be achieved is involved in the present invention.

In the above-mentioned respective embodiments, the function θ of the rotational speed ω has the functional form indicated in the portion (B) of FIG. 4. In the present invention, the function θ may be an increasing function of the rotational speed ω, and may alternatively employ such a function θ having a desirable functional form in correspondence with the control purpose. For instance, θ may be alternatively such a function that θ≠0 is established not only in a high speed range (ω≧ωi: refer to FIG. 4), but also over the entire range (0≦ω≦ωf) of ω. Further, a quadratic function or higher order functions may be employed. Also, a function indicative of a polygonal line-shaped functional form or a function indicative of a curved line-shaped functional form may be employed.

Also, in the above-mentioned respective embodiments, θ is defined as a one variable function θ(ω) of ω. In accordance with the present invention, if θ corresponds to the increase function of the rotational speed ω, then any variables other than ω may be employed. For example, a multivariable function may be alternatively employed which is changed to either the q-axis current Iq or the torque T. When θ is defined as, for example, a two variable function θ(ω, T) of both ω and T, a torque sensor for measuring T must be provided in addition to the speed sensor 32. θ(ω, T) is calculated by entering ω and T measured by the two sensors to the calculator 26. It should be noted that the respective d-axis and q-axis current commands Id* and Iq* are calculated by the calculator 26 based on θ(ω, T) and the current command I* entered from the speed controller 25. A specific attention should be paid to such a point that the functional form of T of θ(ω, T) must be properly set so that the current command Id* at this time is increased in the negative direction in response to |Iq*|. Also, in this example, in the case where Iq is employed as the second variable instead of the variable T, if Iq outputted from the three-phase/two-phase converter 34 is also entered to the calculator 26, then the calculator 26 can calculate θ(ω, Iq) in combination with ω outputted from the speed sensor 32.

Also, in the above-mentioned respective embodiments, the speed controller 25 inputs thereinto only the speed deviation Δω so as to calculate the current command I*, and then, outputs the current command I*. In the present invention, by inputting the speed ω measured in the speed sensor, the torque measured in the separately provided torque sensor, and, both Id and Iq derived from the three-phase/two-phase converter 34 to the speed controller 25, the speed controller 25 may alternatively calculate a more proper current command I* by considering those respective measurement amounts, and then, may output this more proper current command I*.

INDUSTRIAL APPLICABILITY

The present invention can be utilized in a servomotor such as an AC servomotor, and a current control method thereof.

The invention claimed is:

1. A current control method for a servomotor,
the servomotor comprising: an armature having armature windings of multiple phases; and a field,
the servomotor having such a structure that: armature currents are supplied to the armature windings having the respective multiple phases to generate armature magnetic flux; and the armature and the field are relatively rotated with each other based on an interaction between the armature magnetic flux and field flux produced by the field to generate rotation force, the current control method comprising:

supplying a negative d-axis current Id to the armature to which a dq conversion has been performed while a d-axis direction is a direction of the field flux to prevent an occurrence of a voltage saturation in the servomotor, wherein under a condition that a relative rotational speed of the armature and the field is constant, the d-axis current Id in a negative direction is related to a magnitude |Iq| of the q-axis current.

2. The current control method according to claim 1, wherein an absolute value of a synthetic current I which flows through the armature and is expressed by $I^2 = Id^2 + Iq^2$ is limited so that the absolute value does not exceed an allowable current value Imax in the armature.

3. The current control method according to claim 1, wherein:

the Id and the Iq are defined so that a relationship of $Id = -|I| \cdot \sin\theta$ and $Iq = I \cdot \cos\theta$ are respectively satisfied with respect to the synthetic current I flowing through the armature and a phase angle $\theta$ which, satisfies $0° \leq \theta < 90°$; and the phase angle $\theta$ is defined as an increase function of the relative rotational speed of the armature and the field.

4. The current control method according to claim 1, wherein:

Id and Iq are defined so that a relationship of $Id = -|Iq| \cdot \tan\theta$ is satisfied with respect to the phase angle $\theta$ which satisfies $0° \leq \theta < 90°$; and the phase angle $\theta$ is defined as an increase function of the relative rotational speed of the armature and the field.

5. A servomotor, comprising:

an armature having armature windings of multiple phases; and a field, wherein armature currents are supplied to the armature windings having the respective multiple phases to generate armature magnetic flux; and the armature and the field are relatively rotated with each other based on an interaction between the armature magnetic flux and field flux produced by the field to generate rotation force, wherein:

the servomotor further comprises a current commander that outputs a q-axis command Iq* for generating torque and a negative d-axis current command Id* for preventing an occurrence of a voltage saturation as current commands with respect to the armature to which a dq conversion has been performed while a d-axis direction is a direction of the field flux; and the d-axis current command Id* is outputted so that, under a condition that a relative rotational speed of the armature and the field is constant, the d-axis current command Id* in a negative direction is related to a magnitude |Iq*| of the q-axis current command.

6. The servomotor according to claim 5, wherein:

the current commander comprises:

a synthetic current commander that outputs a synthetic current command I* of the armature; and a dq current commander that calculates and outputs the Id* and the Iq* from the I* so that a relationship of $I^{*2} = Id^{*2} + Iq^{*2}$ is satisfied; and the synthetic current commander comprises a limiter that limits an absolute value of I* so that the absolute value of I* does not exceed an allowable current value Imax in the armature.

7. The servomotor according to claim 5, further comprising a speed sensor that measures a speed of the relative rotation motion, wherein the current commander comprises:

a synthetic current commander that outputs a synthetic current command I* of the armature; and a dq current commander that calculates a phase angle $\theta$ which satisfies $0° \leq \theta < 90°$ from a speed measured by the speed sensor as an increase function with respect to the measured speed, and calculates and outputs the Id* and the Iq* from the I* so that a relationship of $Id^* = -|I| \cdot \sin\theta$ and $Iq^* = I^* \cdot \cos\theta$ are respectively satisfied.

8. The servomotor according to claim 5, further comprising a speed sensor that measures a speed of the relative rotation motion, wherein the current commander comprises:

a provisional synthetic current commander that outputs a provisional synthetic current command I*; and a dq current commander that calculates a phase angle $\theta$ which satisfying $0° \leq \theta < 90°$ from a speed measured by the speed sensor as an increase function with respect to the measured speed, and calculates and outputs the Id* and the Iq* so that a relationship of $Id^* = -|I^*| \cdot \tan\theta$ and $Iq^* = I^*$ are respectively satisfied with respect to the I*.

9. The servomotor according to claim 8, wherein the current commander comprises a limiter that limits an absolute value of a synthetic current Is* of the armature so that an absolute value of the synthetic current Is* which is expressed by $Is^{*2} = Id^{*2} + Iq^{*2} = I^{*2} \cdot (1 + \tan^2\theta)$ does not exceed an allowable current value Imax of the armature.

* * * * *